(12) United States Patent
Schiavone et al.

(10) Patent No.: US 6,598,851 B2
(45) Date of Patent: Jul. 29, 2003

(54) VALVE FOR THE CONTROL OF LARGE-SECTION FLOWS, IN PARTICULAR FOR COMPRESSORS OR THE LIKE

(75) Inventors: Massimo Schiavone, Carrara (IT); Andrea Bianchi, Massa (IT)

(73) Assignee: Dott.ing. Mario Cozzani S.r.l., Arcola (IT)

( * ) Notice: Subject to any disclaimer, the term of this patent is extended or adjusted under 35 U.S.C. 154(b) by 0 days.

(21) Appl. No.: 10/203,886

(22) PCT Filed: Jan. 23, 2001

(86) PCT No.: PCT/EP01/00702

§ 371 (c)(1),
(2), (4) Date: Aug. 15, 2002

(87) PCT Pub. No.: WO01/65157

PCT Pub. Date: Sep. 7, 2001

(65) Prior Publication Data

US 2003/0010950 A1 Jan. 16, 2003

(30) Foreign Application Priority Data

Mar. 2, 2000 (IT) .......................................... GE00A0032

(51) Int. Cl.[7] ................................................ F16K 3/02
(52) U.S. Cl. .................................. 251/129.11; 251/314
(58) Field of Search ....................... 251/129.01–129.14, 251/304–317.01, 205–209

(56) References Cited

U.S. PATENT DOCUMENTS

| | | | | |
|---|---|---|---|---|
| 4,328,831 A | * | 5/1982 | Wolff | 251/208 |
| 4,516,606 A | * | 5/1985 | Worley | 251/208 |
| 4,678,002 A | * | 7/1987 | Valley | 251/208 |
| 5,150,737 A | * | 9/1992 | Clerc | 251/208 |
| 5,398,724 A | * | 3/1995 | Vars et al. | 251/129.01 |
| 5,417,083 A | * | 5/1995 | Eber | 251/208 |
| 6,113,063 A | * | 9/2000 | Takahashi et al. | 251/308 |

* cited by examiner

Primary Examiner—Paul J. Hirsch
(74) Attorney, Agent, or Firm—Larson & Taylor PLC

(57) ABSTRACT

Valve for the control of large-section flows with high operating frequency, and in particular for compressors or the like, comprising a flow aperture (102; 106) and a closure device (3; 8), said flow aperture comprising one or more orifices (102; 106) formed on a fixed body (2; 6) cooperating with said closure device (3; 8) and introduced into the flow channel (1), said closure device (3; 8) rotating with respect to an axis perpendicular to the plane on which said fixed body (2; 6) lies, and being equipped with driving means (5); said closure device (3; 8) is equipped with at least a hollow (123; 138) on the surface facing said fixed body (2; 6) which houses an insert (113; 118), said insert being formed so as to be substantially complementary with said orifice (102; 106) of said fixed body (2; 6).

8 Claims, 3 Drawing Sheets

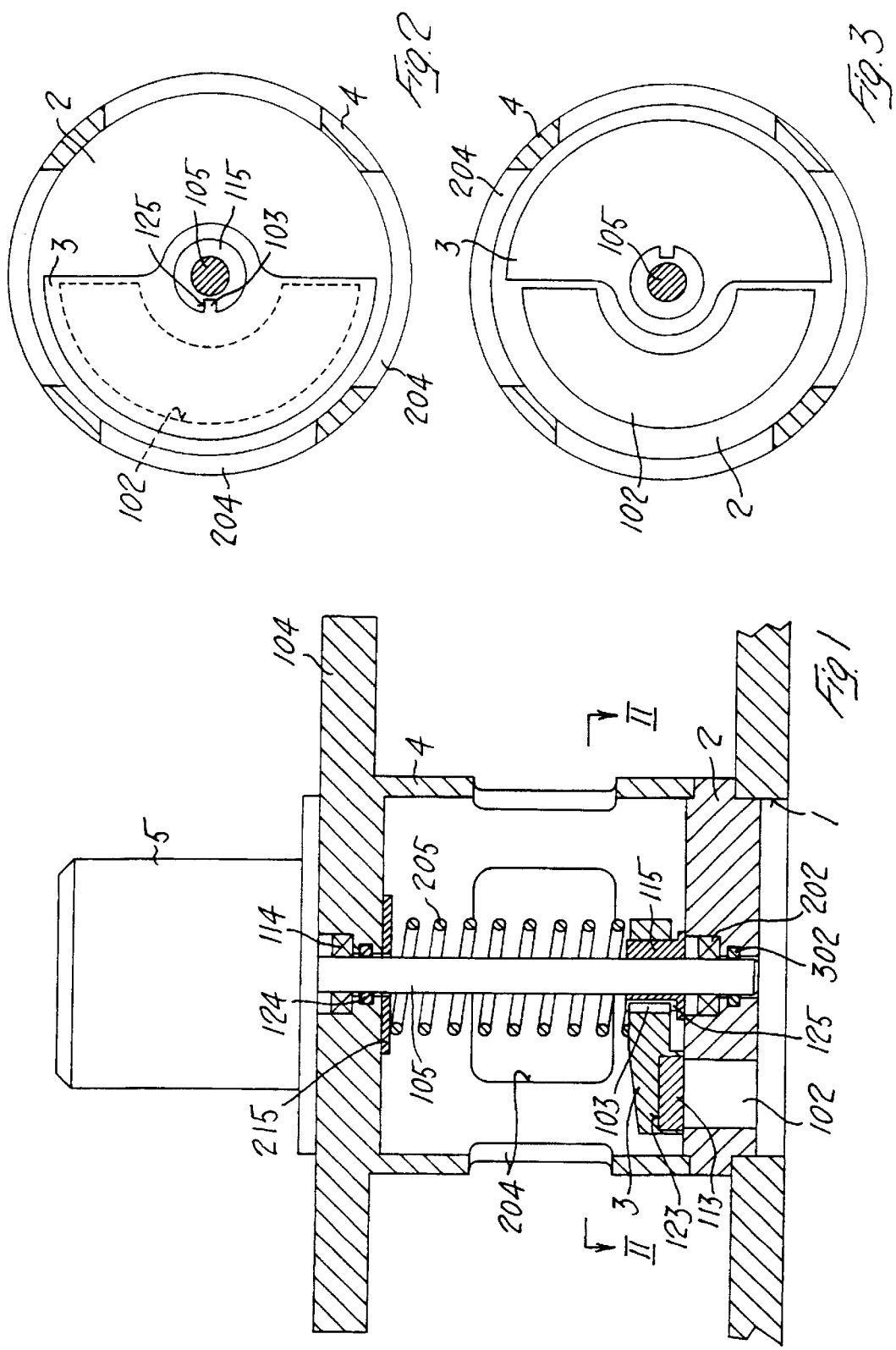

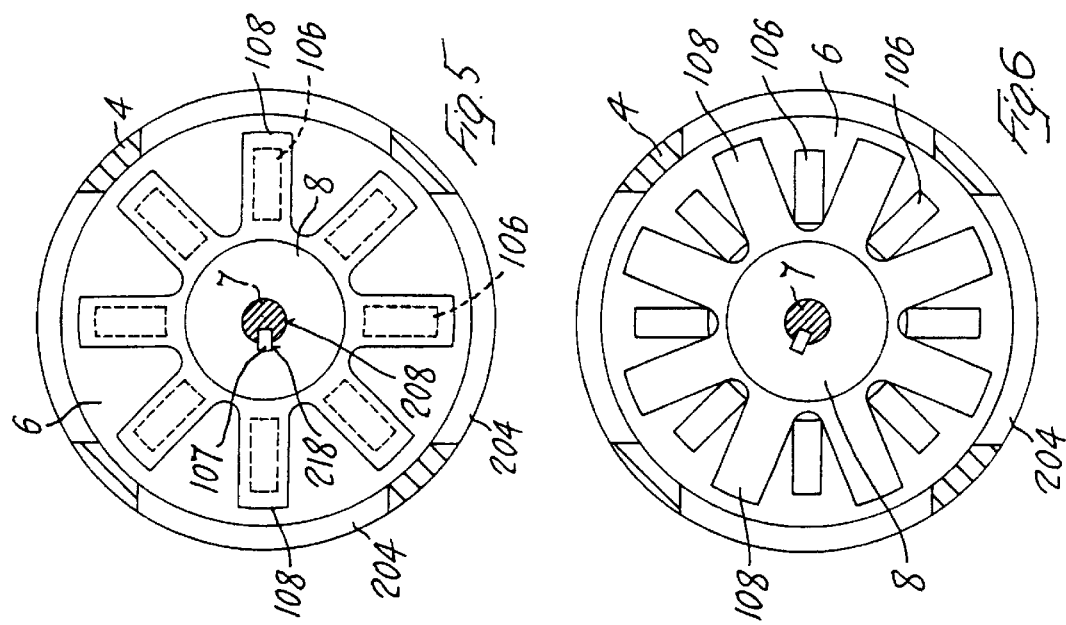
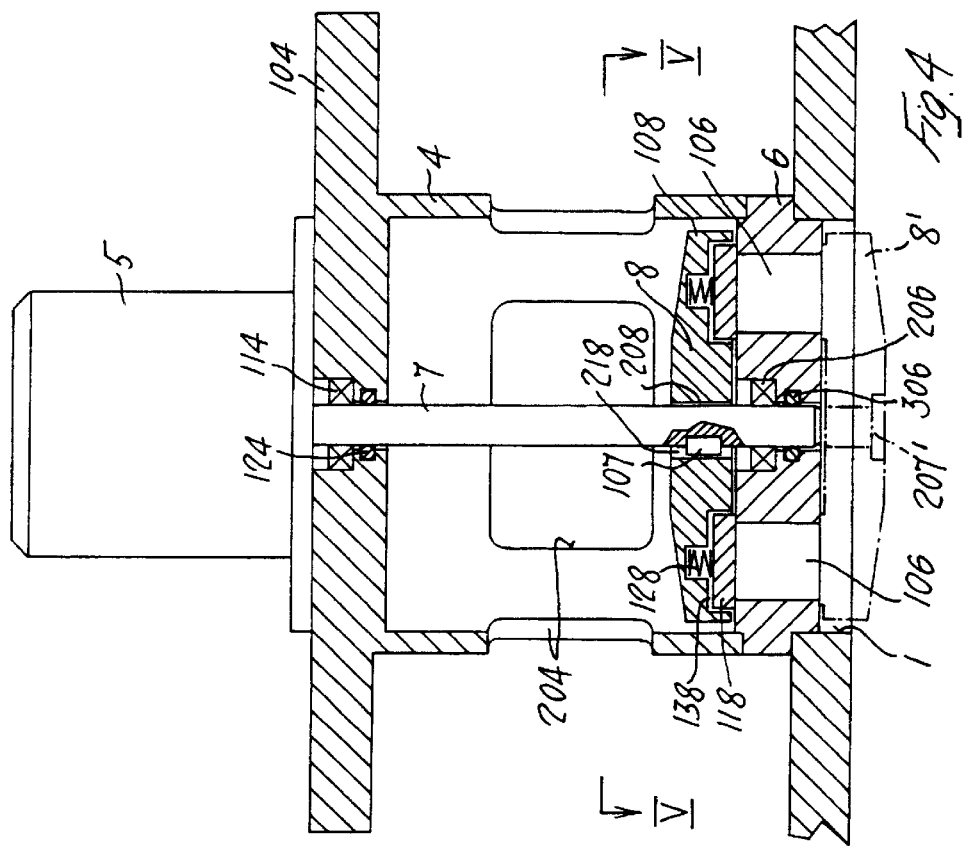

VALVE FOR THE CONTROL OF LARGE-SECTION FLOWS, IN PARTICULAR FOR COMPRESSORS OR THE LIKE

DESCRIPTION

The present invention relates to valves, and in particular it relates to a valve for the control of large-section flows, in particular for compressors or the like.

In compressors the control of flows having large diameters, between 40 and 400 mm, is combined with opening/closing frequencies which can be very high, for instance thousands of cycles per minute. These particular needs have brought to the evolution towards automatic valves, i.e. in which the closure device is forced in the closing position of the aperture by suitably designed elastic return means, said valves being formed so that the moving equipment can rapidly react, therefore by dividing the aperture into a plurality of orifices with parallel axes or coaxial one with respect to the other.

The problems resulting from this kind of approach are connected to the high number of stresses exerted onto moving portions, considering that in a compressor operating at 1,000 rpm a closure device is subject to 1,000 opening shocks and 1,000 closing shocks, besides the effort exerted onto the springs. As far as the latter are concerned, it should be observed that their design is difficult in order to obtain a homogenous load distribution in the valve seat. Another disadvantage to overcome concerns losses of head undergone by the fluid while going through the valve channels.

Moreover, a great attention is directed to the possibility of reducing the flow rate according to the request of compressed fluid, so as to save power. Generally, the reduction of flow rate corresponds to a delay in closing intake valves, which results in a reduction of the effective volume of the fluid to be compressed. At present said reduction is obtained by means of linear actuators acting onto the automatic valves and pneumatically driven. In some cases complex electro-hydraulic controllers are used: an example of this kind is disclosed in EP-A-0893605.

U.S. Pat. No. 5,695,325 discloses another system used to obtain a reduction of flow rate in fluid compressors; in this case the aim is reached by a reciprocal rotation between valves and their seats, so as to prevent their closure for a given period of time calculated on the basis of the amount of flow rate to be reduced.

In order to overcome problems concerning wear and control of automatic valves, rotating valves equipped with driving means have been carried out. EP-A-0971160 describes an actively driven valve for a piston compressor with a valve plate and a counter-plate, both equipped with passage apertures; the valve plate is supported so as to turn around the longitudinal axis of the valve and with respect to the counter-plate. Moreover, it is provided for a driving device firmly connected to the valve plate so as to rotate it with respect to the counter-plate. Problems concerning frictions and sealing between plate and counter-plate, and also those concerning the retrieval of clearances due to wear are solved by using a combined translation-rotation motion of the plate with respect to the counter-plate, said translation being driven along the rotation axis of said counter-plate.

A problem arising from this kind of choice concerns the reciprocal sealing between plate and counter-plate and the efforts undergone by the means translating the plate towards the counter-plate.

The aim of the present invention, therefore, is to provide a valve which best suits the needs of apparatus such as fluid compressors, minimizing problems concerning operating frequency and losses of head while going through valve channels, and which also enables a simple control of the compressor flow rate without using complex and expensive integrating systems.

The scope of the present invention, therefore, is a valve for the control of large-section flows with high operating frequency, and in particular for compressors or the like, comprising a flow aperture and a closure device, said flow aperture comprising one or more orifices formed on a fixed body cooperating with said closure device and introduced into the flow channel, said closure device being rotatable with respect to an axis perpendicular to the body on which said flow aperture lies, and provided with driving means, characterized in that said closure device is equipped with at least a hollow on its surface facing said fixed body housing an insert, said insert being formed so as to be substantially complementary with said orifice of said fixed body.

In a preferred embodiment, said closure device is mounted for rotation about a shaft coupled at one end with driving means and rotatably and sealingly mounted into said fixed body. Advantageously, said closure device is mounted on the side of the fixed body corresponding to flow direction in the valve.

Further characteristics and advantages of the present invention will be apparent from the following detailed description of some preferred embodiments, carried out as a mere non-limiting example with reference to the accompanying drawings, in which:

FIG. 1 is a section view of a first embodiment of the present invention;

FIG. 2 is a section view according to line II—II of FIG. 1;

FIG. 3 is a view analogous to the one in FIG. 2, with the closure device rotated with respect to the valve seat;

FIG. 4 is a section view of a second embodiment of the valve according to the invention;

FIG. 5 is a section view according to line V—V of FIG. 4;

FIG. 6 is a view analogous to the one in FIG. 5, with the closure device rotated with respect to the valve seat;

Figure 7:
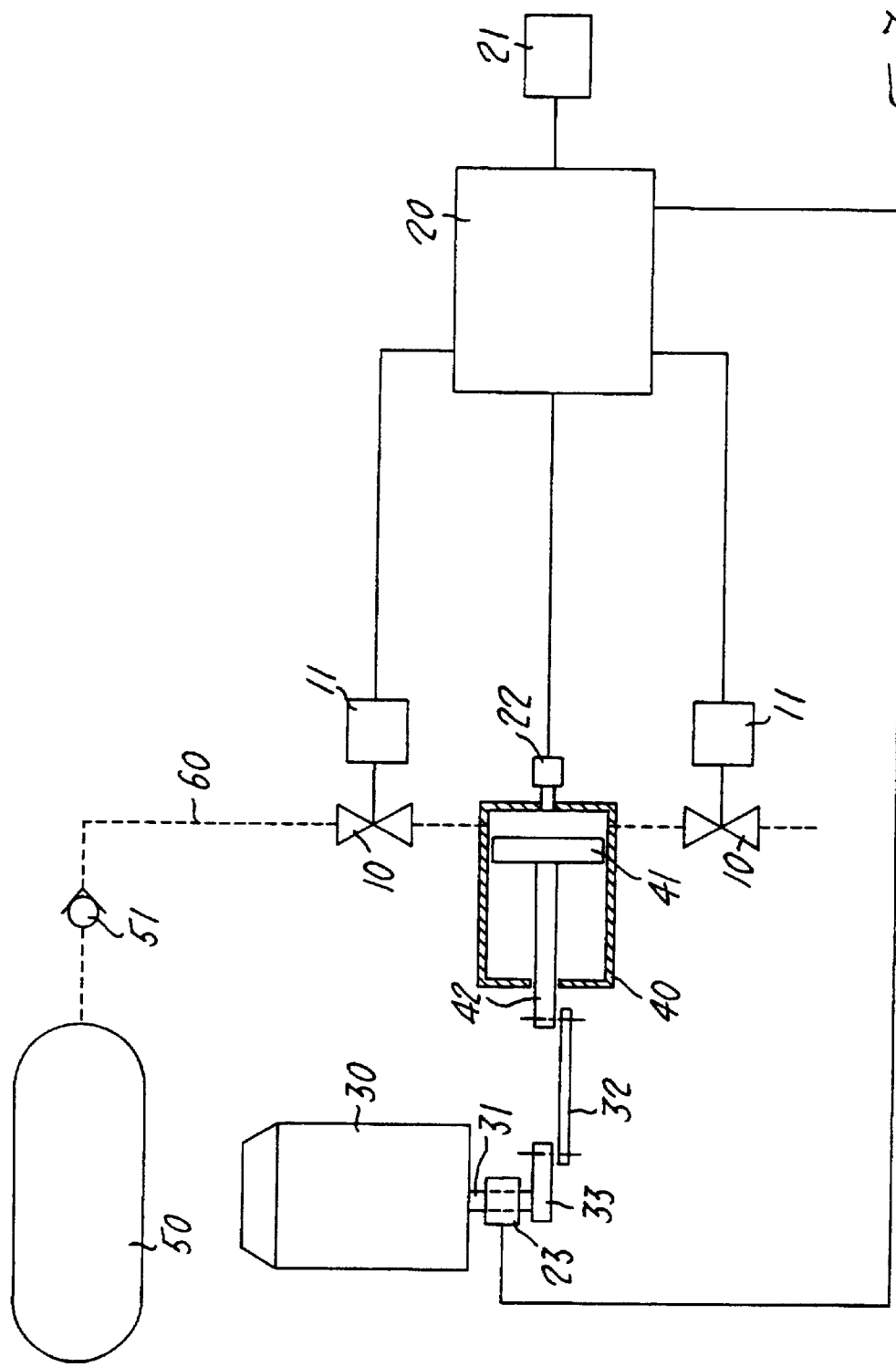
FIG. 7 is a schematic diagram showing a compressor equipped with the valves according to the present invention.

FIG. 1 shows a first embodiment of the valve according to the present invention; the numeral 1 indicates the controlled flow channel from the valve according to the present invention. A fixed body 2 is introduced into the channel 1, said fixed body consisting of a plate with an orifice 102. On the fixed body 2 a cover 4 is placed, whose side walls show window-shaped openings 204. The end of the cover 4 opposed to the end placed on the fixed body 2 shows a plate 104. Through said plate 104, a shaft 105 is introduced axially with respect to the cover 4, sealingly by means of the sealing element 124 and turnably thanks to the sliding means 114; said shaft 105 is connected on one end to the motor 5, and on the other end it fits into the fixed body 2. Also within the body 2 said shaft cooperates with sliding means 202 and a sealing element 302. A bush 115 is fitted onto the shaft 105, said bush being equipped with a radial hollow 125, into which the toothed protuberance 103 of the closure device 3 fits, said protuberance being located in contact with the surface of the fixed body 2 by means of the insert 113 placed in the hollow 123 formed within the closure device 3; in this figure the closure device 3 is shown in closing position of the orifice 102. A spring 205 acts onto the closure device 3, said spring abutting on the opposite end onto the plate 104 of the cover 4 by means of a suitable creeping means 215. FIG. 2 clearly shows the position of the closure device 3 with respect to the orifice 102 of the body 2, which represents in this case the whole valve opening; FIG. 3, on the contrary, shows the closure device in a position in which it does not interfere with the orifice 102.

FIG. 4 shows a second embodiment of the valve according to the invention; the same parts are indicated with the same numerals. The fixed body 6 is introduced in this case into the flow channel 1, said fixed body being provided with the orifices 106 which cooperate with the inserts 118 of the closure device 8. Said inserts are housed in the hollows 138 formed within the closure device 8 and are equipped with springs 128. The closure device 8 is connected to the shaft 7 of the motor 5 by means of the key 107 radially protruding from said shaft 7, which fits into the hollow 218 formed on the wall of the axial through hole 208. The shaft is equipped with sliding means and sealing means both on the plate 104 of the cover 4 and on the fixed body 6, similarly to what is described in the embodiment of FIG. 1. A hatched and dotted line shows an execution variant of the valve in which the closure device 8' is placed on the opposite side with respect to the fixed body 6; in this case the shaft 7 is equipped with a head 207'.

FIG. 5 shows more clearly the shape of the closure device 8, which has a plurality of radial arms 108 housing the inserts 118 cooperating with the orifices 106 of the fixed body 6; in the case shown the valve opening is completely obstructed by the closure device 8, while in FIG. 6 said closure device is rotated so as to leave all orifices 106 free.

FIG. 7 eventually shows a schematic example of application for the valve according to the present invention, used in a reciprocating compressor. The compressor comprises a motor 30, whose shaft 31 is connected by transmission means 32, 33 to the handle of a piston 41 sliding within a cylinder 40. The valves 10, carried out according to the present invention, control the suction and delivery stages of the cylinder 40 along the flow duct 60; said valves 10 are equipped with control interfaces 11 for their driving means, said interfaces being connected to a central processing unit 20, provided with data input and display means 21, and connected in its turn to the sensor 22 communicating with the chamber of the cylinder 40 and with the sensor 23 placed on the shaft of the motor 30. The duct 60 ends in the tank 50 containing the compressed fluid, and it is equipped with a non-return valve 51.

The operation of the valve according to the present invention will be evident from the following. With the introduction of a closure device creeping with respect to the valve aperture a large number of problems shown by known valves for this kind of applications, i.e. for large-section flows with high operating frequency can be easily and effectively overcome thanks to modern materials with high mechanical properties, specifically having low friction and low wear factor, such as polyether ketones (PEEK) carbon fibre reinforced. As a matter of fact, the fixed body, whose task is to resist stresses induced by the pressure difference between the inside of the compressor cylinder and the ducts of said compressor containing the valve aperture, which can consist of only one orifice 102 as in FIG. 1 or by a plurality of orifices 106 as in FIG. 4, is in contact with the insert or inserts, which are in their turn integral with the closure device 3, as in FIG. 1, or 8, as in FIG. 4, rotating around its axis, which is coaxial with respect to the axis of the fixed body. The compensation of the clearances between the surface of the fixed body 2 and the one of the insert 113, shown in FIG. 1, is carried out by means of the compression spring 205. As for FIG. 2, where closure devices are manifold, the compression springs 128 are inserted into hollows 138 formed on the surface of the moving body 8 facing the fixed body 6. Thus, the compression springs 205, 128 used in the present invention are not subject to dynamic loads but only to static loads.

The motor 5 controlling this kind of valve is a stepper-motor, preferably a brushless motor, or a similar driving system enabling rotations of a given angle around an axis. It is evident from the figures that the more the valve aperture is divided into orifices spaced at the same angular distance, the smaller the rotation angle of the shaft required for a valve opening/closing cycle will be. As a matter of fact, if in the embodiment of FIG. 1 said cycle is carried out with a whole rotation of the shaft 105, the shaft 7 will only have to rotate of an angle of 45°. This expedient further reduces the wear of contacting surfaces.

In the valve according to the invention the closure devices are no longer subject to dynamic shocks, and differently from automatic valves used at the state of the art no complex designs are required for the return springs of the closure device; moreover, inertia of the valve system against the fluid flow should no longer be taken into account. The fluid course itself within the valve is extremely simplified, so as to highly reduce losses of head.

Also the application in the specific field of compressors is affected by the above-mentioned advantages and shows others. For instance, patents quoted as belonging to the prior art describe apparatus enabling flow rate variation by controlling the closure delay of intake valves. In a compressor corresponding to the type shown in FIG. 7 this kind of control does not require any additional apparatus, since valve opening and closure is driven and controllable by means of the central processing unit 20. The detection of the angular position of the crank 33 through the sensor 23 allows to establish such closure delay times of the intake valve to enable the reduction of the compressors flow rate. Advantageously, the non-return valve 51, here generally described, can also be a valve according to the present invention, suitably controlled by unit 20.

What is claimed is:

1. Valve for the control of large-section flows with high operating frequency, and in particular for compressors or the like, comprising a flow aperture and a closure device, said flow aperture comprising one or more orifices formed on a fixed body co-operating with said closure device and introduced into the flow channel, said closure device rotating with respect to an axis perpendicular to the plane on which said fixed body lies, and being equipped with driving means, characterized in that said closure device is equipped with at least a hollow on the surface facing said fixed body which houses an insert, said insert being formed so as to be substantially complementary with said orifice of said fixed body.

2. Valve according to claim 1, in which said closure device is turnably mounted onto a shaft coupled on an end with driving means and introduced turnably and sealingly into said fixed body.

3. Valve according to claim 2, in which said closure device is mounted on the side of the fixed body corresponding to flow direction in the valve.

4. Valve according to claim 3, in which it is provided for elastic charging means of said closure device against said fixed body.

5. Valve according to claim 4, in which said elastic charging means are introduced into the same hollow housing said insert.

6. Valve according to claim 4, in which said elastic charging means are place coaxially with respect to said shaft.

7. Valve according to claim 1, in which said insert is made of a material with high mechanical properties, such as polyether ketones (PEEK) carbon fiber reinforced or the like.

8. Valve according to claim 1, in which said driving means comprise a brushless motor, a stepper motor or the like.

* * * * *